No. 636,824. Patented Nov. 14, 1899.
J. W. MARKEY.
CHUCK BONE HOLDER.
(Application filed Mar. 16, 1898.)
(No Model.)
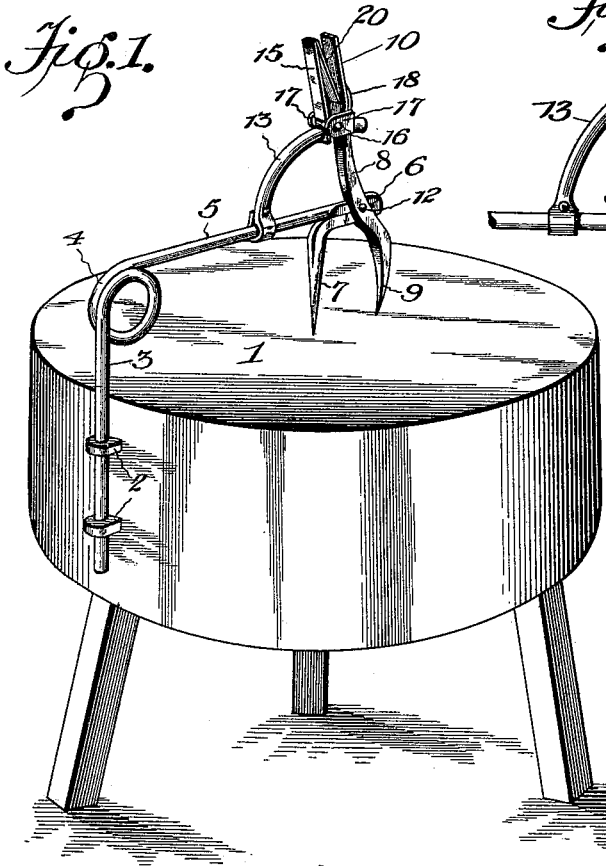
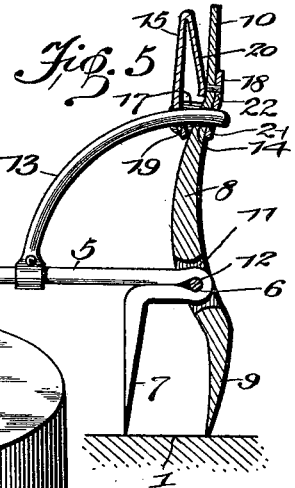
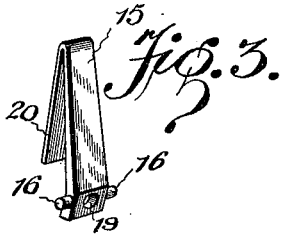
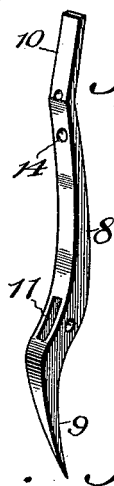
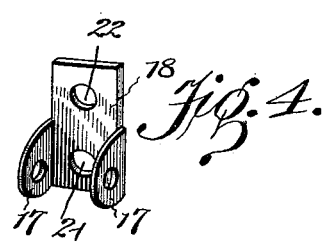
Witnesses
A. Roy Appleman
T. B. Shepard
Joseph W. Markey, Inventor.
By his Attorneys,
C. A. Snow & Co.
THE NORRIS PETERS CO., PHOTO-LITHO., WASHINGTON, D. C.

UNITED STATES PATENT OFFICE.

JOSEPH W. MARKEY, OF MIAMI, INDIAN TERRITORY.

CHUCK-BONE HOLDER.

SPECIFICATION forming part of Letters Patent No. 636,824, dated November 14, 1899.

Application filed March 16, 1898. Serial No. 674,056. (No model.)

*To all whom it may concern:*

Be it known that I, JOSEPH W. MARKEY, a citizen of the United States, residing at Miami, Peoria Nation, Indian Territory, have invented a new and useful Chuck-Bone Holder, of which the following is a specification.

This invention relates to devices for holding meat securely upon a chopping-block, table, or the like, so that the meat may be conveniently sliced and the bone sawed off.

The object of the invention is to provide a device of this character which can be quickly and conveniently placed upon a chopping-block, table, stand, or the like to firmly retain the meat thereon without the employment of skewers or spikes, which are usually driven through the meat and into the wooden block. The use of spikes causes holes to be made in the top of the block, which collect the scraps of meat and bone, and thus soon render the block unfit for use by reason of the top of the block becoming uneven and porous, and the cuttings collect in the holes and cause the block to become sour or tainted.

To obviate the difficulties enumerated, the present invention consists in the combination and arrangement of parts, as will be hereinafter more fully described, shown in the accompanying drawings, and particularly pointed out in the appended claims.

In the drawings, Figure 1 is a perspective view of the device applied to a chopping-block. Fig. 2 is a detail perspective view of the pivoted jaw. Fig. 3 is a detail perspective view of the thumb-detent. Fig. 4 is a detail perspective view of the plate for mounting the thumb-detent. Fig. 5 is a longitudinal sectional view taken through the pivoted jaw.

Corresponding parts are designated by like reference characters in all the figures of the drawings.

Referring to the accompanying drawings, 1 designates a chopping-block of common form, which serves to illustrate the application of the invention. A pair of vertically-alined eyebolts 2 are provided in one side of the block, and the supporting-rod 3 is adapted to be carried by these eyebolts. This supporting-rod extends a suitable distance above the top of the chopping-block, where it is bent or twisted into a spring-coil 4 and then extended laterally across the block, forming a spring-arm 5. Near its outer free end the arm is flattened and bent back upon itself to form an eye 6, and the extremity thereof is inclined downwardly, providing a fixed pointed finger or jaw 7.

A lever 8 (shown in detail in Fig. 2) is pivoted to the outer end of the arm 5 and is provided at its lower end with a pointed finger or jaw 9 and an operating-handle 10 at its upper end. This lever is pivoted to the arm 5 by providing a slot 11 through the lever just above the jaw 9, and the eye 6 of the arm is adapted to be received within the slot. A suitable pivot-pin 12 is passed laterally through the side walls of the slot 11 and the eye 6, whereby the lever is pivotally mounted upon the arm 5. An arcuate guide-rod 13, struck from the pivot 12 of the lever 8 as a center, is provided upon the spring-arm 5 and adapted to be slidably received through an opening 14, provided in the lever 8, whereby the latter is guided in its movement.

In order that the jaws may be fixed when they have been set into the piece of meat, an adjusting or clamping mechanism is provided, which consists of a thumb-detent 15, mounted upon the lever 8 and adapted to frictionally engage the guide-rod 13. As shown in Fig. 3, the detent is provided with a pair of opposite pivot-pins 16 near its lower end, and an opening 19 is formed between the pivot-pins in the line of the axial center thereof. The detent is bent intermediate its ends to form a suitable spring-tongue 20. The detent is mounted upon the lever 8 by means of a bracket 18, having opposite bearing-ears 17 and two openings formed through its body, one of them, 21, situated between the ears and the other, 22, above the former. This bracket is fitted to the outer face of the handle 10 of the lever 8, having the opening 22 alined with the opening 14 of the lever and riveted thereto through the other opening 22. The detent has its pivot-pins mounted in the ears of the bracket and receives the guide-rod 13 through the opening 19, the spring-tongue being slidably engaged against the inner face of the handle of the lever 8. The opening 19 in the detent is somewhat larger in diameter than the guide-rod 13, so that when the opening is properly alined with the rod by pressing with the hand upon the detent and against the pressure of the spring 20 the lever 8 may be operated as desired upon its pivot 12 as a center. When the lever has been adjusted, the detent is released, and under the action of the spring-tongue 20 it will be turned upon its pivots and the edges of the opening 19 caused to bite or frictionally engage the guide 13, whereby the lever will be locked.

In the operation of the device a piece of meat is placed upon the block 1, and then the outer free end of the arm 5, carrying operating mechanism, is elevated above the meat, and the jaws 7 and 9 are then forced into the same, astride of the bone. The detent is then unlocked from its engagement with the guide-rod 13, and the lever 8 is operated to clamp the bone firmly between the two jaws, after which the detent is released and the jaws are firmly locked upon the meat, and the latter is held firmly upon the block in a convenient manner for cutting.

It will be observed that the pointed jaws 7 and 9 do not at any time engage the top of the block, and therefore no holes are formed therein, whereby the block may be kept perfectly sweet and clean. The arm 5 is preferably of a length to reach about the center of the top of the block, at which point the jaws are usually used, although the arm is capable of being swung laterally upon its support in the eyebolts 2 to any desired position. The upper eyebolt 2 may be set in or out, as desired, to vary the tension of the arm 5 and the height of the jaws above the block.

Changes in the form, proportion, and minor details of construction and arrangement may be made without departing from the spirit and scope or sacrificing any of the advantages of the invention.

Having thus described the invention, what is claimed is—

1. In a device of the class described, the combination of an upright support adapted to be fitted to a chopping-block or the like, a transverse arm carried by the support located above the top of the chopping-block and adjustable both laterally and vertically, a relatively-fixed jaw pendent from the free end of the arm, a pendent movable jaw hinged or pivoted to the arm and adapted to coöperate with the fixed jaw, and an operating-handle for the movable jaw, whereby a piece of meat may be held down upon the face of the chopping-block, substantially as shown and described.

2. In a device of the class described, the combination of a supporting-rod adapted to be fitted to a chopping-block or the like, an arm having a fixed meat-engaging jaw and carried by the supporting-rod, a lever pivoted upon the arm, a meat-engaging jaw at one end of the lever and an operating-handle at the other end thereof, a guide carried by the arm and adapted to guide the operating-handle, and a thumb-detent carried by the lever and adapted to engage the guide, whereby the lever may be locked, substantially as shown and described.

3. In a device of the class described, the combination with an upright supporting-rod twisted intermediate of its ends, providing a spring-coil and an arm extending at substantially right angles to the supporting-rod, the latter being adapted to be fitted to a chopping-block or the like, and capable of an axial movement, of a fixed jaw pendent from the arm, a movable pendent jaw pivoted or hinged to the outer free end of the arm and adapted to coöperate with the fixed jaw, and an operating-handle for the movable jaw, substantially as shown and described.

4. In a device of the class described, the combination of a spring-supporting arm bent upon itself forming a fixed jaw and a bearing-eye, a lever pivoted in said eye and forming a movable jaw, an arcuate guide carried by the spring-arm and passing loosely through an opening formed in the lever, a thumb-detent carried by the lever and adapted to frictionally engage the guide, and a spring for the detent, substantially as and for the purpose set forth.

5. In a device of the class described, the combination of a supporting-rod adapted to be fitted to a chopping-block or the like, a movable arm carried by the supporting-rod, a fixed jaw provided upon the arm, a movable jaw pivoted to the arm, an operating-handle for the movable jaw, and a guide carried by the arm, whereby the handle is guided in its operation, substantially as shown and described.

6. In a device of the class described, the combination of a supporting-rod adapted to be fitted to a chopping-block or the like, an arm carried by the supporting-rod, a fixed jaw provided upon the arm, a movable jaw pivoted to the arm, an operating-handle for the movable jaw, a guide carried by the arm and adapted to guide the handle in its operation, and a thumb-detent carried by the operating-handle and adapted to frictionally engage the guide, whereby the movable jaw may be locked, substantially as shown and described.

7. In a device of the class described, the combination of an arm, a fixed jaw carried thereby, a movable jaw pivoted to the arm, an operating-handle for the pivoted jaw, an arcuate guide carried by the arm and adapted to guide the handle in its operation, adjusting means for the operating-handle, comprising a thumb-detent made from a single blank of metal bent intermediate its ends forming a spring-tongue and the detent proper, the latter having an opening formed therethrough and provided with pivot-pins, and bearing-ears provided upon the operating-handle, the detent having its pivot-pins mounted in the ears, and its opening receiving the arcuate guide, substantially as and for the purpose set forth.

8. A device of the class described, comprising a supporting-arm bent upon itself forming an eye and a fixed jaw, a lever having a jaw at one end, an operating-handle at the other end thereof, and provided with a slot formed therethrough intermediate its jaw and handle, the eye of the arm being received within the slot of the lever, and a pivot-pin passing transversely through the walls of the slot and the eye, whereby the lever is pivotally mounted upon the arm, substantially as shown and described.

In testimony that I claim the foregoing as my own I have hereto affixed my signature in the presence of two witnesses.

JOSEPH W. MARKEY.

Witnesses:
CAMILES D. SMITH,
JOHN C. GINTER.